United States Patent [19]

Veser

[11] Patent Number: 4,633,575
[45] Date of Patent: Jan. 6, 1987

[54] PROCESS FOR THE WINDING OF STATORS OF ELECTRIC MOTORS

[76] Inventor: Franz Veser, Kanalstrasse 16, D-7980 Ravensburg, Fed. Rep. of Germany

[21] Appl. No.: 712,775

[22] Filed: Mar. 18, 1985

[30] Foreign Application Priority Data

Mar. 16, 1984 [DE] Fed. Rep. of Germany ....... 3409684

[51] Int. Cl.⁴ ............................................. H02K 15/06
[52] U.S. Cl. ........................................ 29/596; 29/606; 29/736
[58] Field of Search .................. 29/596, 606, 732, 734, 29/736

[56] References Cited

U.S. PATENT DOCUMENTS 4,204,318  5/1980  Kirbis et al. ...................... 29/736 X
4,291,459  9/1981  Barrera ................................ 29/734

Primary Examiner—Carl E. Hall
Attorney, Agent, or Firm—Spencer & Frank

[57] ABSTRACT

A working process for the winding of stators (1) of electric motors, in which the coils (12) are inserted between two spreadable elastic tongues (4a and 4b) of draw-in needles and are introduced into the stator grooves (2) in this way and the coils (12) are interconnected according to the polarity before being drawn-in, is improved in terms of its applicability to small and very small-size motors and of greater economy. The process steps are: fixing the stator (1) provided with groove insulations in a vertical axial position, laying the needle tongues (4a, 4b) against one another in pairs and inserting them into a draw-in tool with correct polarity, introducing them centrally into the stator (1) up to a predetermined groove length, positive connection of the tool to a draw-in spindle (9), placing elastic caps over every two adjacent needle tongues, threading the coil strands in between the spread needle tongues, placing a guide ring over the inserted coil heads, introducing a fixing star (19) between the needle rings as a draw-in guide, and pulling the tool through downwards until the top ends of the draw-in needles are flush with the top edge of the stator. The draw-in tool serving for carrying out the process as well as the improved draw-in needles and the auxiliary devices are described.

3 Claims, 9 Drawing Figures

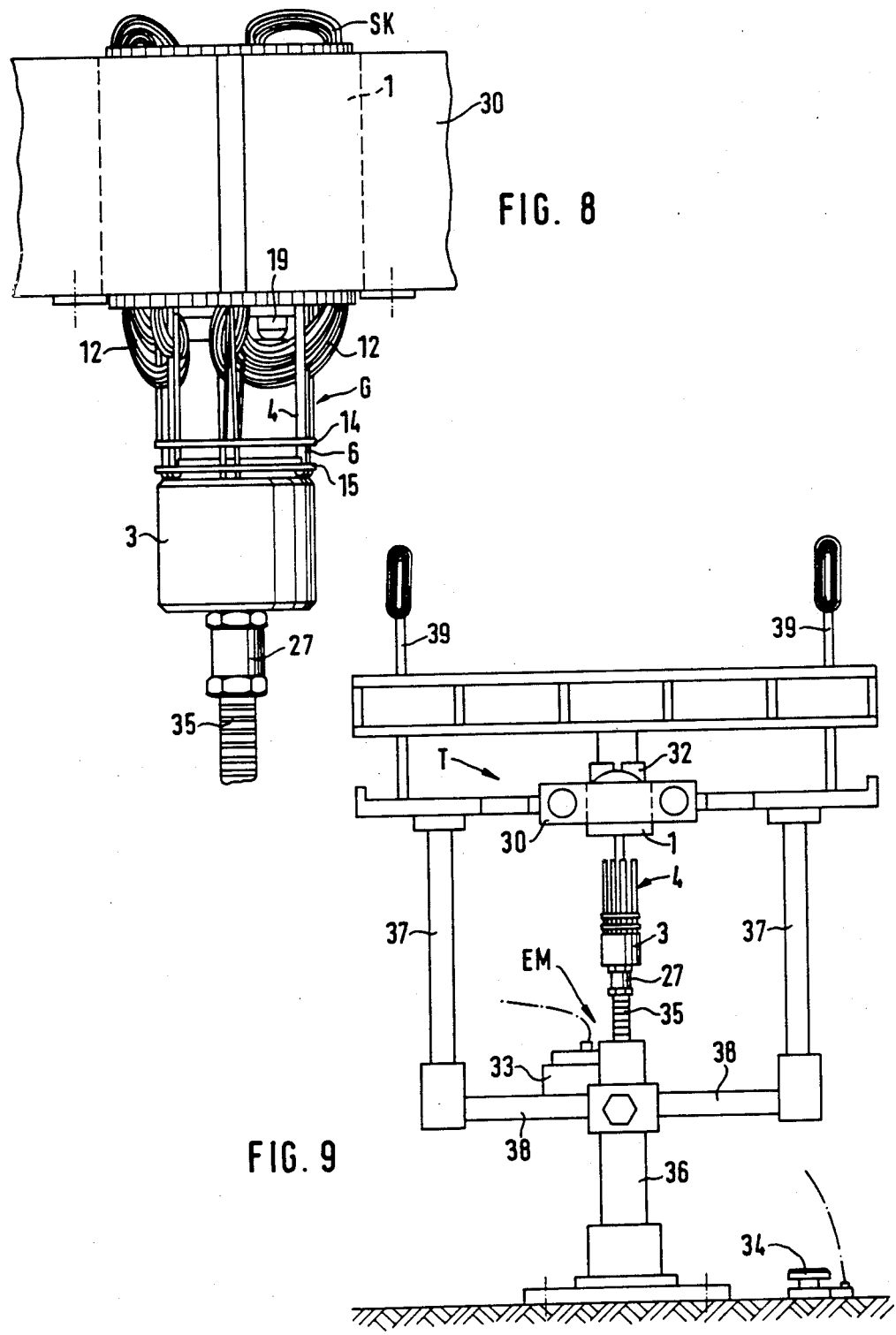

PROCESS FOR THE WINDING OF STATORS OF ELECTRIC MOTORS

The invention relates to a working process and an apparatus for the winding of stators of electric motors, especially of small-size motors, the coils being inserted individually or in groups between spreadable elastic tongues of draw-in needles and being introduced into the stator grooves by mechanical means, and the coil groups being laid out according to the number of poles, so that the coils can be interconnected according to the polarity before being drawn in.

Draw-in needles of the abovementioned type, which have proved appropriate in practice, and their handling means have become known, for example, from German Patent Specification No. 2,658,891 and from the advertising literature of relevant companies. The designs and appliances shown there are intended, in particular, for winding the stators of motors of medium and larger sizes. In such cases, the conditions as regards space, in particular the inside diameter of the stator and the distances separating the stator grooves, are sufficient to make it possible to use the known draw-in needles in order to produce without particular difficulty multi-layer windings with all the numbers of poles occurring in practice. At the same time, the draw-in needles subjected to high stress can be given appropriate dimensions and can be designed so that their handling and mode of operation produce substantial technical and economic advances in comparison with previous winding processes, bearing in mind that the cheap manufacture of the draw-in needles and their service life must also be considered as positive factors.

However, it has been shown that the known proven draw-in needles and their working process in their design and form existing hitherto are not suitable or are only suitable to a limited extent for the winding of stators of small and very small electric motors. The reason for this restriction is that the diameter of the stator interior and the distances separating the grooves and the receiving slot of the grooves in small-size motors have dimensions making it very difficult or even impossible to ensure a fully mechanised use of the known draw-in needles.

It is therefore advisable, as before, to carry out the winding of small-size stators manually by threading the coil wires bit by bit into the grooves, and as is known, in addition to a high outlay in terms of working time and physical effort, the adherence to various quality requirements presents problems. This relates, in particular, to the reliability of the workforce, observance of the groove-filling factor and the prevention of damage to the wire enamel. An adversely high failure rate of the product can also arise as a result of these possible deficiencies in the quality of work. In addition, the other secondary jobs in the production of ready-to-use stators, that is to say the interconnection of the phases with the correct polarity, the final shaping of the coil heads and the phase insulation, have also had to be carried out hitherto by time-consuming manual work, the frequent changes in the working position of the workpiece also taking up additional work time.

Starting from the technology which has proved appropriate in practice, namely carrying out stator winding mechanically with the use of the abovementioned known draw-in needles, the object of the invention is to make it possible to apply the high efficiency of this technology even to small-size stators and thereby largely eliminate the previous manual working process. Strictly speaking, the object of the invention is therefore, in particular, to adapt the known drawn-in needle to the present intended use in an economical way and to find a practicable working process for the mechanical use of these special draw-in needles.

Furthermore, the further jobs and means for making the stator ready to use will also be integrated in the working process, in such a way that even the ancillary times are substantially reduced in comparison with those hitherto and an increase in product quality is guaranteed.

These objects are achieved in an advantageous way by means of the novel working process and devices according to the invention. These ensure that the actual winding of stators for small and very small motors can now be carried out exclusively mechanically and substantially more economically than hitherto, and that virtually faultless stator winding at an economical outlay, in technical terms is guaranteed. Moreover, the handling of the working apparatus according to the invention can be learnt easily, so that even interconnected multi-tier windings can be produced perfectly by auxiliary workers.

The process steps characterised in the working process according to the invention make it possible to prepare and carry out the mechanical winding of small stators in a technically logical and time-saving sequence, in which all the coils of one winding layer (tier) can be drawn in at the same time in a single operation. Because the stator is clamped in a vertical position, it is held in a clearly visible, easily accessible working position, but one which can be varied and fixed as required, the necessary auxiliary devices being integrated in the apparatus. These serve, in particular, as wire-protecting draw-in aids and guide means for the coil strands, so that after being drawn in, the coil layers then only require slight reshaping.

The device claims devices for carrying out the invention include a draw-in tool, draw-in needle and auxiliary devices. The draw-in tool and the means of fastening the draw-in needles quickly and securely to the tool, using two perforated disks arranged at a distance above one another for the positive anchoring of the needles, ensure a holding effect corresponding to the stress exerted. The simple production and easy exchangeability of these parts are particularly advantageous, and one type of needle can be used for several stator sizes.

The draw-in tool makes it possible in a simple way to adjust the draw-in needle position automatically to the fixed course of the stator grooves, so that jamming and points of friction are largely avoided during the drawing-in operation. Moreover, this means that the use of these needle supports can be extended to standard motors with slight differences in the data and to obliquely grooved stators.

The draw-in needle is matched to the given dimensions of small motors. In the present invention, in contrast to the known draw-in needles, to reduce the space requirement the butt parts of the two flat needle tongues are not connected unreleasably by means of welding or riveting. Preferably, the two needle tongues are laid flat against one another for insertion into the retaining holes of the perforated disks. This simplification results not only in cheaper production, but also in the advantage that each needle tongue, if damaged, can be exchanged individually, whereas, where the known "large" needles are concerned, in the event of damage the complete needle is useless and has to be replaced by a new one.

The draw-in needles can be connected in pairs as an aid for inserting the draw-in needles into the receiving holes of the perforated disks, the possibility of separating the needle tongues intact to exchange them separately being preserved.

The invention further includes useful draw-in aids which ensure that the individual coil strands, when drawn in, cannot be displaced either radially or tangentially in the restricted inner space of the stator with a disturbing effect. The order safeguarded thereby is also especially important for accommodating multi-tier windings. The means characterised in Claim 13 prevents the cover slides from being inadvertently displaced further downwards beyond their final position by the pressure plate.

The final shaping of the coil heads is carried out by known tools and, for example, the phase insulation can be applied quickly and accurately by means of a mechanical device. The clamping chuck for receiving the stator is rotatable about a horizontal axis, so that the stator can be pivoted into any suitable working position and fixed there for the final shaping of the lower coil heads.

After the stator has been extracted from the apparatus, the latter is ready for the next stator-winding operation without any special resetting.

The usefulness of the invention is not restricted to the mass-production of small-size motors, but, because of the easy exchangeability of its various means, can also be used advantageously in repair work, the possibility of using one needle size for stators of different sizes having a particularly favourable effect.

Exemplary embodiments of the devices according to the invention are illustrated diagrammatically in the drawings.

Figure 5:
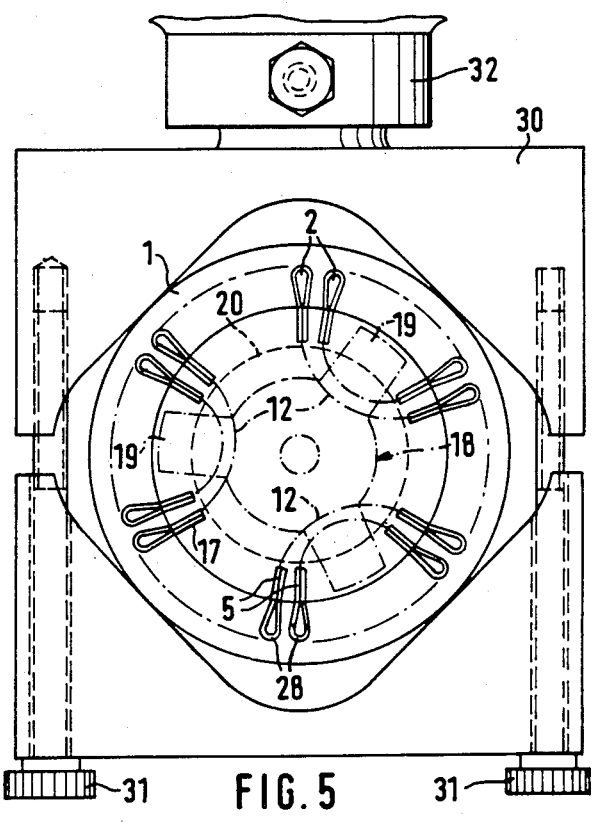
Figure 6:
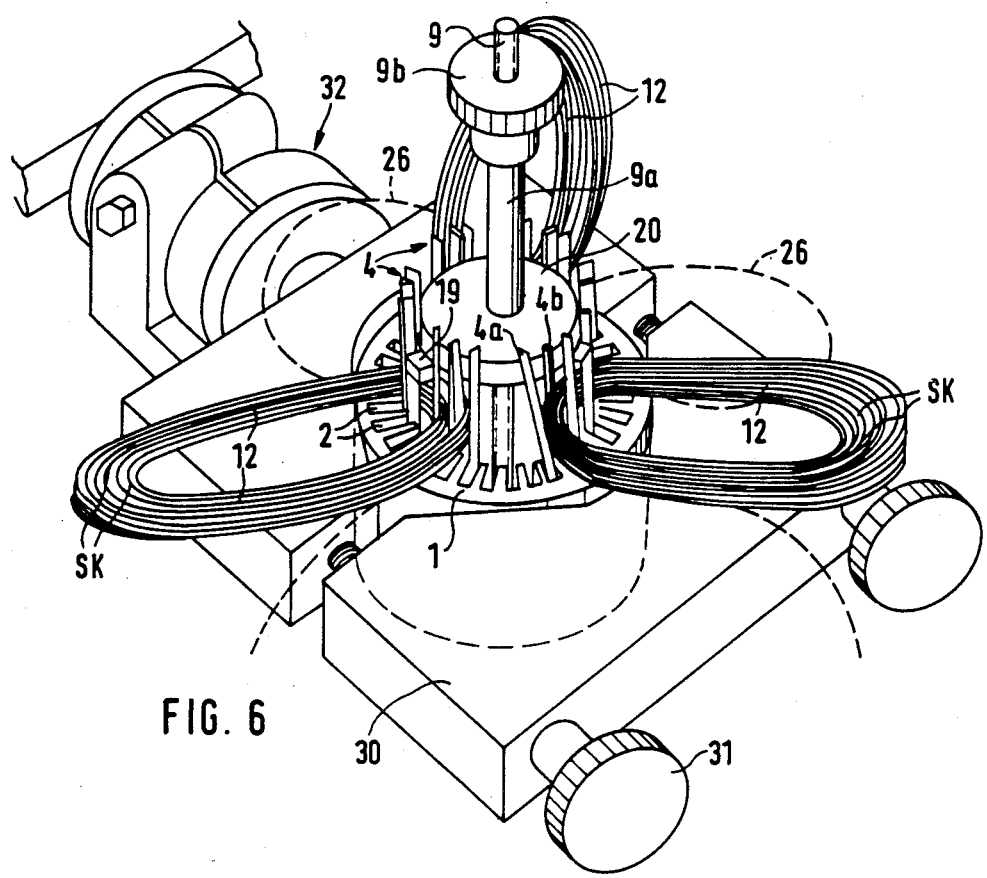
Figure 7:
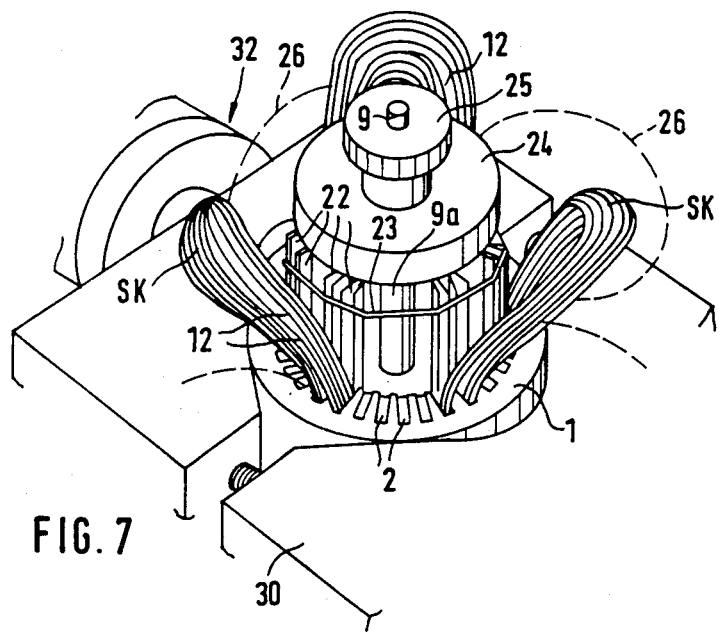

FIG. 5 shows the stator held in the clamping chuck, with the draw-in tool (seen from above), FIG. 6 shows the apparatus in a three-dimensional representation, at the start of the drawing-in operation, FIG. 7 shows the apparatus with inserted cover slides and a pressure plate, FIG. 8 shows the apparatus after the coils and cover slides have been introduced completely into the stator, FIG. 9 shows the apparatus as a whole with a work table.

FIGS. 1 to 9 (sheets I, II, III) described below relate, as an exemplary embodiment, to a working apparatus by means of which a six-pole multi-layer stator winding can be produced. In it, the stator 1 has thirty-six stator grooves 2 (FIG. 5), into which three symmetrically arranged coil groups, each with two coils 12, can be drawn into the stator at the same time, corresponding to the number of the poles. The draw-in needles 4 are used for this, each of which consists of two elastic needle tongues 4a, 4b and can be fixed to the draw-in tool 3 by means of their butt parts 6. For this purpose, there are two matching perforated disks 14 and 15, each possessing a ring of holes 16, the number of holes of which corresponds respectively to at least the number of grooves of the stator to be wound, the hole width being suitable for receiving the butt parts 6 of two needle tongues laid against one another. The perforated disks are arranged at a distance above one another on a connecting body 13 provided with a collar 21.

The parts 13, 14, and 15 are fastened to a centrally continuous draw-in spindle 9 by means of screwing and the fastening of the perforated disks 14 and 15 can be loosened so that the disks can be rotated slightly relative to one another and, if necessary, fixed in an end position.

Figure 3:
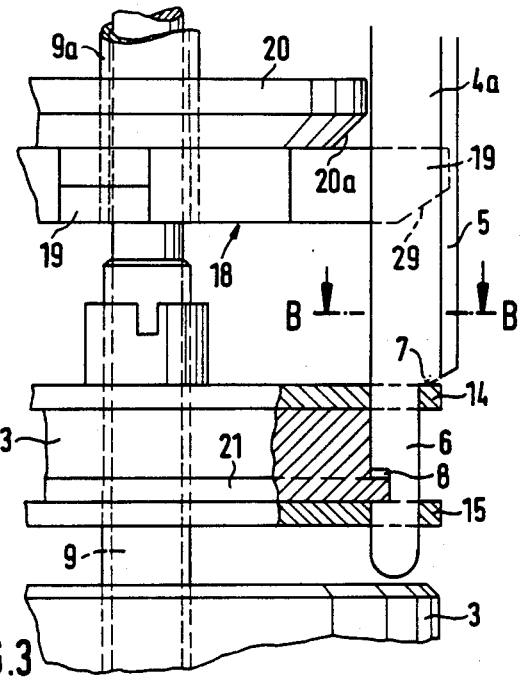
FIG. 3 shows the section A/A from FIG. 1 (enlarged) with a fixing star.

The elastic tongues 4a, 4b of the draw-in needle 4 are each provided with a guide strip 5, the projecting part of which extends up to the narrower butt part 6 of the needle. At this point, there is an offset edge 7 which limits the axial pushing-in of the draw-in needle. Moreover, a recess 8 is provided in the butt part 6 (FIG. 3). The draw-in tool 3 is fitted with draw-in needles 4 in such a way that, after the parts 13, 14 and 15 have been fixed to the draw-in spindle 9, the draw-in needles 4, in groups (G) corresponding to the number of poles, are pushed with their butt parts 6 into the receiving holes 17 of the perforated disks 14, 15, until their offset edge 7 contacts the copper perforated disk 14.

Figure 4:
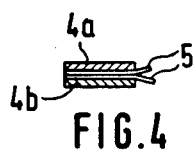
FIG. 4 shows the section B/B from FIG. 3

At the same time, the recess 8 of the butt part 6 of the needle is brought into positive engagement with the collar 21 of the connecting body 13, the two needle tongues 4a, 4b being laid flat against one another (FIG. 4). Since the width of the receiving hole 17 in the perforated disks 14, 15 corresponds to the thickness of the needle butt parts 6 laid against one another, a secure retaining action between these two parts is obtained. The insertion of the needles can be facilitated by glueing the butt parts 6 in pairs to one another before insertion, in such a way that can nondestructively be separated again.

The positive fixing of the draw-in needles in correctly poled groups to the draw-in tool 3 is sufficiently stable for transferring the forces, arising on drawing in, in a uniform distribution to the needle ring or to the wire coils 12.

As an aid to rapid and reliable threading of the coils between the spead tongues 4a, 4b of the draw-in needles, an elastic cap 11 is placed over the two adjacent tongues of every two needle groups, so that inadvertent threading of coils between the draw-in needles is avoided by means of this orientation aid.

Figure 2:
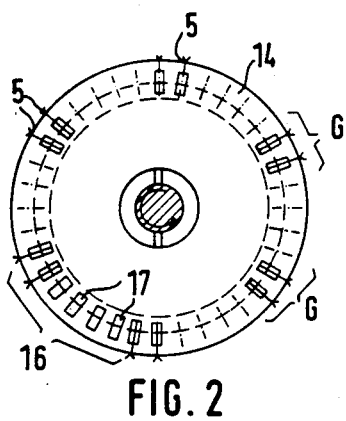
FIG. 2 shows parts of FIG. 1, seen from above.

In FIGS. 2 and 5, only the guide strips 5 of the six needle groups denoted by G are shown for the sake of clarity. FIG. 5 also shows by the dot-and-dash lines the path of the coils 12 threaded into the needle groups. These coils are held in the correct position necessary for the subsequent drawing-in by means of a fixing star 18 (FIG. 3) pushed in from above, lateral deflection of the draw-in needle also being prevented at the same time. These effects are guaranteed due to the fact that the radial engaging arms 19 of the fixing star project inwards between the coils 12 of a group to almost the inner stator edge. Furthermore, the arms 19 rest on the underside of a circular guide plate 20, the diameter of which corresponds to the inside diameter of the needle ring so that radial displacement of the draw-in needle is also prevented. The fixing star 18 with the guide plate 20 can be connected to the draw-in spindle 9, in such a way that the plate 20 can additionally transmit the drawing-in movement (arrow E) to the coil strands. The engaging arms 19 have an end face 29 bevelled on the drawing side, and the guide plate 19 is provided with an edge bevel 20a.

Before being fitted with draw-in needles, the stator 1 provided with the groove insulations 28 (FIG. 5) is inserted between the jaws of a clamping device 30 rotatable about a horizontal axis H, in such a way that the top edge of the stator is flush with the jaw plane. Subsequently, the stator axis is centered relative to the central draw-in spindle 9, for example by means of inner clamping tongs. The draw-in tool 3 is connected to the draw-in mechanism EM by means of a spindle coupling 27 (FIG. 8). After the vertical axes of the stator and of the draw-in spindle have been aligned with one another, the stator is fixed in the clamping device 30, for example by means of clamping screws 31.

FIG. 6 illustrates the apparatus immediately before the start of the drawing-in operation. The draw-in tool 3 equipped with the draw-in needles 4 is inserted into the stator 1 from above. Two flat wire coils 12 are introduced between the tongues 4a, 4b of each of the adjacent needles 4 and the caps 11 are removed from the draw-in needles. Furthermore, coil groups G are connected with the correct polarity by means of the switch connections 26 of the first winding tier. The fixing star 18, 19 together with the guide plate 20 is fastened to a spacer tube 9a and pushed into the interior of the needle ring, so that the engaging arms 19 rest on the coils 12 (see also FIG. 5).

Figure 1:
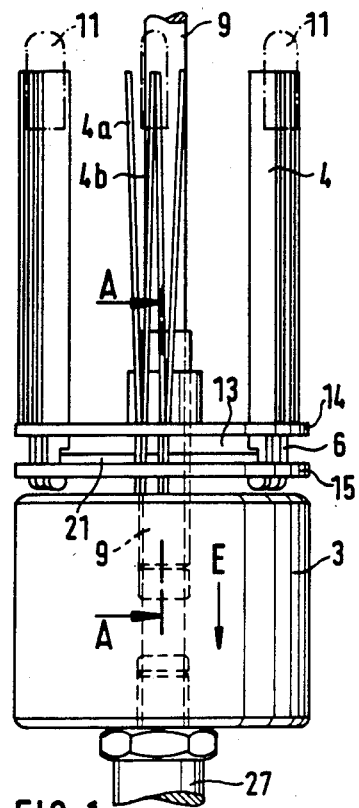
FIG. 1 shows a side view of the draw-in tool with draw-in needles.

After the spacer tube 9a has been connected to the draw-in spindle 9, for example by means of a screw connection 9b, the motor 33 of the draw-in mechanism EM (FIG. 9) is switched on by means of the foot switch 34, so that the drawing force via a rack 35 moves the draw-in spindle 9 together with the draw-in tool 3, the draw-in needle groups G and the fixing star 18, 19, 20 through the stator 1 in the direction E (FIG. 1). The coils 12 are thereby drawn into the stator grooves 2, the fixing star 18, 19, 20 guiding and centering the needles to the advantage of reliable drawing-in and working speed. A retaining ring (not shown) can be placed over the needle ring as a further means of securing the needle position.

As a result of this first drawing-in stage, the draw-in needles 4 are drawn in until their top ends are flush with the top edge of the stator, the fixing star 18, 19, 20 continuing to remain in the stator. As shown in FIG. 7, the cover slides 22 are now inserted from above into the groove slots over the introduced coil strands 12 and above the draw-in needles, and the parts of the cover slides 22 projecting freely at the top are aligned with the stator center by means of an elastic girdle 23. Moreover, a pressure plate 24 centered on the draw-in spindle 9 is placed on the cover slides 22 of U-shaped profile and is connected to the draw-in spindle 9 by means of a screw coupling 25, the pull connection between the parts 9, 9a being preserved.

In the second drawing-in stage which now follows, the cover slides 22 are pushed into the stator grooves by the pressure plate 24 and thereby close the groove slots. At the same time, the coil strands 12 clamped between the needle tongues are forcibly drawn along by the tool 3 (FIG. 1), the fixing star 18 performing the auxiliary functions already described. When the pressure plate 24 rests on the top edge of the stator 1, all the cover slides are pushed in, so that the pressure plate 24 can be removed after the screw coupling 25 has been released.

Subsequent further drawing-in is continued until the state shown in FIG. 8 is reached. Here, the tool 3 together with the needle groups G is moved out of the stator 1, so that the draw-in needles 4 can be pulled off from the coils 12 secured in the stator grooves. The fixing star 18 is pulled out of the stator together with the tool 3, the bevelled end faces of its arms 19 pressing the inward-projecting coil parts radially outwards. The spindle coupling 27 is then released, so that the entire draw-in tool can be removed.

The lower and upper coil heads inserted into the stator are tied in the usual way and brought into their final shape by means of a device. At the same time, the clamping device 30 with the stator 1 can be brought into any pivoting position required on the pivoting head 32 and fixed.

FIG. 9 illustrates diagrammatically the apparatus as a whole with a work table T. The tripod-like legs 37 for the work table are guided so as to be vertically adjustable and fixable on a central support 36. Arranged on a cross member 38 connected to these legs is the motor 33 for driving the vertical rack 35 which can be connected to the tool 3 by means of the spindle coupling 27. The motor is controlled by the foot switch 34. At the height of the work table, the stator-clamping device 30 is attached to the pivoting head 32. Containers for accessories and the carriers 39 for reserve coils are provided above the work table.

The clearly arranged devices illustrated and their mostly mechanical functions permit the economical and energy-saving winding of small stators. The logical sequence and simplicity of the individual working steps allow auxiliary workers to be employed, whilst at the same time ensuring an improvement of the product.

I claim:

1. Working process for winding stator coils on a stator of an electric motor, the stator having a top edge and a center axis and being formed with grooves that extend parallel to the center axis and that are provided with groove insulations, and the process being carried out with the aid of draw-in needles each having two spreadable elastic tongues and each tongue having a free end, a draw-in tool for supporting the needles, a vertically adjustable work table, a draw-in mechanism, a central vertical draw in spindle coupled to the draw-in mechanism and a fixing star and a guide plate connectable to the spindle, the coils being laid out in coil groups according to the number of stator poles and being interconnected according to polarity before being drawn into the stator grooves, said process comprising the following successive steps:
    (a) centering the stator in a vertical axial position in relation to the central vertical draw-in spindle and fixing the stator at a selected working height on the vertically adjustable work table;
    (b) inserting all the draw-in needles into the draw-in tool in a ring in the correct pole order, with the free ends of the tongues directed upwardly and with each needle having a tongue disposed adjacent a tongue of one other needle, then introducing the draw-in tool centrally into the stator from above with the tongues of each needle being laid against one another and spread apart at the top and being pushed axially into the stator grooves up to a predetermined groove length, and positively connecting the draw-in tool to the draw-in spindle;
    (c) placing an elastic cap as an aid for correct coil insertion over every two adjacent needle tongues and threading coils in between the tongues of each needle;

(d) placing the fixing star and the guide plate over the coils and positively connecting the fixing star and the guide plate to the draw-in spindle; and (e) carrying out a first draw-in procedure including drawing the draw-in tool with the coils downwardly mechanically by the draw-in mechanism until the free ends of the draw-in needle tongues are flush with the top edge of the stator.

2. A process according to claim 1 comprising, after said first draw-in procedure, the further steps of: pushing elongate cover slides downwardly along the stator grooves so that a major part of each cover slide projects upwardly from the stator; holding the cover slides in a vertical position by means of an elastic girdle; then placing a pressure plate onto the upper ends of the cover slides and connecting the pressure plate to the draw-in spindle; and then carrying out a second draw-in procedure while causing the pressure plate to press the cover slides into the grooves so that the grooves are closed.

3. A process according to claim 2 wherein the fixing star has downwardly directed beveled edges, and said second draw-in procedure comprises, after the cover slides have been pressed into the grooves: removing the elastic girdle and the pressure plate; moving the draw-in tool downwardly out of the stator; and moving the fixing star downwardly out of the stator so that parts of the coils at the lower portion of the stator are pressed radially outwardly by the beveled edges of the fixing star.

* * * * *